(12) United States Patent
Jamal-Syed et al.

(10) Patent No.: US 9,769,863 B2
(45) Date of Patent: Sep. 19, 2017

(54) MUSIC PLAYLIST APPLICATION

(71) Applicant: Telefonaktiebolaget LM Ericsson (publ), Stockholm (SE)

(72) Inventors: Shaheer Jamal-Syed, Shanghai (CN); Andreas Ljunggren, Vällingby (SE); Edwin Tam, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/129,558

(22) PCT Filed: Mar. 31, 2014

(86) PCT No.: PCT/CN2014/074425
§ 371 (c)(1),
(2) Date: Sep. 27, 2016

(87) PCT Pub. No.: WO2015/149230
PCT Pub. Date: Oct. 8, 2015

(65) Prior Publication Data
US 2017/0171898 A1    Jun. 15, 2017

(51) Int. Cl.
*G06F 7/00* (2006.01)
*G06F 17/30* (2006.01)
*H04W 76/02* (2009.01)
*H04W 4/00* (2009.01)
*H04W 8/00* (2009.01)

(52) U.S. Cl.
CPC .... *H04W 76/023* (2013.01); *G06F 17/30752* (2013.01); *G06F 17/30772* (2013.01); *H04W 4/005* (2013.01); *H04W 4/008* (2013.01); *H04W 8/005* (2013.01)

(58) Field of Classification Search
CPC ......... G06F 17/30053; G06F 17/30749; G06F 17/30772
USPC .................... 707/748; 715/745, 747
See application file for complete search history.

(56) References Cited

U.S. PATENT DOCUMENTS

| 2003/0050058 A1* | 3/2003 | Walsh ............... G06F 17/30053 455/426.1 |
| 2010/0017714 A1 | 1/2010 | Agarwal et al. |
| 2010/0228740 A1 | 9/2010 | Cannistraro et al. |
| 2011/0314388 A1 | 12/2011 | Wheatley |

FOREIGN PATENT DOCUMENTS

CN    103608800 A    2/2014

\* cited by examiner

*Primary Examiner* — Lee Nguyen
(74) *Attorney, Agent, or Firm* — Murphy, Bilak & Homiller, PLLC

(57) ABSTRACT

A method for an Application in a M2M Network Node, a M2M Network Node, an Application, and a method for a Music Player Unit and Music Player Unit are presented. A Music Playlist is received from a mobile device and is sent to Application in the M2M Network Node. The Application determines the popularity of the songs, which are included in the received Music Playlist. Determining the popularity is based on determining the occurrence of the songs in a M2M Music Playlist and the Music Playlist received from the Music Player Unit. Information about popularity of at least one song included in the received Music Playlist is then sent back to the Music Player Unit. Finally, the Music Player Unit plays-out the at least one song using a Speaker Unit.

15 Claims, 8 Drawing Sheets

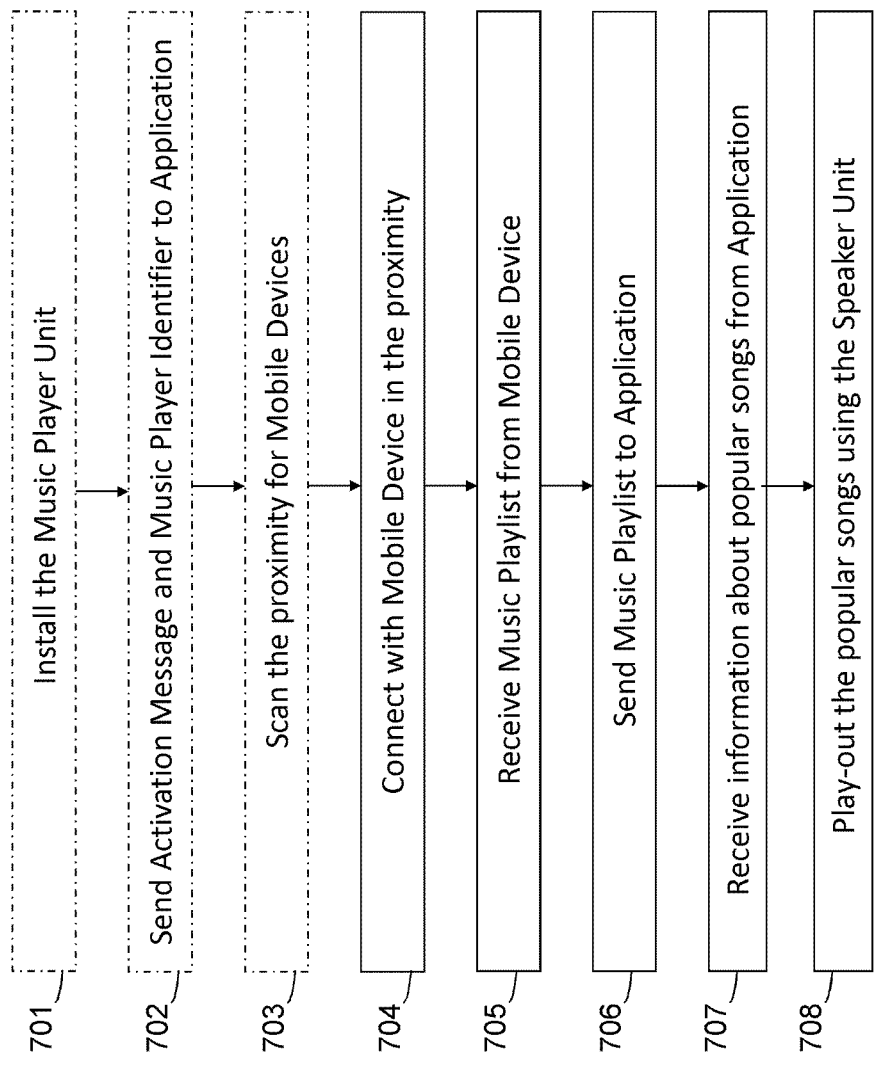

MUSIC PLAYLIST APPLICATION

TECHNICAL FIELD

The present disclosure relates, generally, to an M2M network node, a music player unit, methods for an Application in the M2M network node and for the music player unit and, more particularly, to an Application for determining the popularity of songs.

BACKGROUND

The networked society vision is becoming a reality and by utilizing machine-to-machine (M2M) infrastructure more and more devices can be connected to each other. Technologies like RFID, NFC, Bluetooth, Zigbee and other short-range wireless communication are bringing the commercialization of an entire new set of applications. Combining the improved access technology with new applications leads to new service offering. For example, nowadays people enjoy music by downloading songs or via music streaming services and they can enjoy music from virtually any location using any device, which has the appropriate connectivity.

The listening behavior has also changed because of the unlimited access to music. For example, people can listen to their friends' favorite music either by sharing songs or by sharing music playlists. Disc jockey applications are readily available from several music streaming services and collaborative music playlist are being used for entertainment at parties. In a collaborative music playlist, the music playlist is shared among friend or a community, and friends can then add their music to the playlist. In some situations the collaborative music playlist becomes unpractical, for example, at a party with many participants or at a public place, a restaurant, a bar, or a disco. In those situations, firstly, the share number of participants is large and that results in long music playlists, and, secondly, everyone that is listening to the music being played from the music playlist has his own taste in music. This becomes especially problematic for bars, restaurants, night clubs, in which the music offering is part of the service offering. Therefore, there is a need to provide solutions to music offerings, in general, and music playlists, in particular, for environments where the audience is diverse when it comes to music preferences.

SUMMARY

It is an object in this disclosure to basically address the problems outlined above. These objects and others may be obtained by providing a method and electronic device according to the independent claims attached below.

According to one aspect, a method for an Application in a M2M Network Node is provided, where the M2M Network Node is being provided in a M2M communication network, and is connected to a Music Player Unit, which is further connectable to a Speaker Unit. The method includes receiving a Music Playlist and a Music Player Identifier from the Music Player Unit. The Music Player Identifier identifies the Music Player Unit and associates the Music Player Unit to a Service Subscriber. The method further includes associating the received Music Playlist to a M2M Music Playlist, where the M2M Music Playlist is associated with the Service Subscriber. Furthermore the method includes determining the popularity of the songs, which are included in the received Music Playlist. Determining the popularity is based on determining the occurrence of the songs in the M2M Music Playlist and Music Playlist received from the Music Player Unit. Finally, based on the popularity of the songs, information about popularity of at least one song included in the received Music Playlist is sent to the Music Player Unit.

According to a second aspect, a method for a Music Player Unit is provided. The Music Player Unit being provided in a M2M communication network and is connected to a M2M Network Node and to a Speaker Unit. The method includes connecting to a Mobile Device in the proximity and receiving a Music Playlist from the Mobile Device. The method further includes sending the Music Playlist and a Music Player Identifier to an Application in the M2M network node, where the Music Player Identifier identifies the Music Player Unit and associates the Music Player Unit to a Service Subscriber. Furthermore the method includes receiving information, from the Application, about the popularity of at least one song included in the received Music Playlist. Finally, the method includes playing-out the at least one song using the Speaker Unit.

According to a third aspect, a M2M Network Node is provided. The M2M Network Node is connectable to a M2M communication network and to a Music Player Unit (102). The M2M Network Node includes a processor unit and a memory unit. The memory unit is coupled to the processor unit and includes an Application (504). The Application includes computer readable program code embodied in the memory unit that when executed by the processor unit causes the M2M Network Node to perform operations including: receiving a Music Playlist and a Music Player Identifier from the Music Player Unit. The Music Player Identifier identifies the Music Player Unit and associates the Music Player Unit to a Service Subscriber. The operations further include associating the received Music Playlist to a M2M Music Playlist, where the M2M Music Playlist is associated with the Service Subscriber. Furthermore the operations include determining the popularity of the songs, which are included in the received Music Playlist. Determining the popularity is based on determining the occurrence of the songs in the M2M Music Playlist and Music Playlist received from the Music Player Unit. Finally, the operations include, based on the popularity of the songs, sending information about popularity of at least one song included in the received Music Playlist to the Music Player Unit.

According to a fourth aspect, a Music Player Unit is provided. The Music Player Unit is connectable to a M2M communication network, to a M2M Network Node, and to a Speaker Unit. The Music Player Unit includes a processor unit (506) and a memory unit. The memory unit is coupled to the processor unit and comprising a computer readable program code embodied in the memory unit that when executed by the processor unit causes the Music Player Unit to perform operations including: connecting to a Mobile Device in the proximity and receiving a Music Playlist from the Mobile Device. The operations further include sending the Music Playlist and a Music Player Identifier to an Application in the M2M network node, where the Music Player Identifier identifies the Music Player Unit and associates the Music Player Unit to a Service Subscriber. Furthermore the operations include receiving information, from the Application, about the popularity of at least one song included in the received Music Playlist. Finally, the operations includes playing-out the at least one song using the Speaker Unit.

According to a fifth aspect, an Application (504) for a M2M Network Node (104) having a processing unit (502), memory unit (501), and a communication unit (503), is provided. The Application includes instructions for receiving a Music Playlist and a Music Player Identifier from the Music Player Unit. The Music Player Identifier identifies the Music Player Unit and associates the Music Player Unit to a Service Subscriber. The instructions further include associating the received Music Playlist to a M2M Music Playlist, where the M2M Music Playlist is associated with the Service Subscriber. Furthermore the instructions include determining the popularity of the songs, which are included in the received Music Playlist. Determining the popularity is based on determining the occurrence of the songs in the M2M Music Playlist and Music Playlist received from the Music Player Unit. Finally, the instructions include, based on the popularity of the songs, sending information about popularity of at least one song included in the received Music Playlist to the Music Player Unit.

An advantage that may be achieved when using above solution is that in an environment where several individuals listen to the same music public, the songs are played based on their popularity. The popularity is based on determining the occurrence of the songs in the crowd's music playlists. Thus unpopular songs or songs that are not in the music playlist will most likely not be played. Further possible features and benefits of the invention will be explained in the detailed description below.

BRIEF DESCRIPTION OF THE DRAWINGS

For a better understanding of embodiments described herein, and to show more clearly how they may be carried into effect, reference will now be made, by way of illustration only, to the following drawings in which:

FIG. 8 is a flow diagram of an exemplary embodiment.

DETAILED DESCRIPTION

Briefly described, the embodiments described below can be used for M2M network nodes and Applications therein, and for music players.

In the following description, the solution will be described in more detail with reference to some example embodiments and to the accompanying drawings. For purpose of explanation and not limitation, specific details are set forth, such as particular scenarios, techniques, etc., in order to provide a thorough understanding of the embodiments. However, it is apparent to one skilled in the art that the solution is not limited to these examples but may be implemented in practice by means of other possible embodiments as compared to the details outlined below.

Moreover, those skilled in the art will appreciate that the functions and units explained herein may be implemented using software functioning in conjunction with a programmed microprocessor or a general purpose computer, and/or using an application specific integrated circuit (ASIC). It will also be appreciated that while the embodiments are primarily described in the form of methods and devices, the embodiments may also be realized in a computer program product as well as in a system comprising a computer processor and a memory coupled to the processor, wherein the memory is encoded with one or more programs that may perform the functions disclosed herein.

Figure 1:
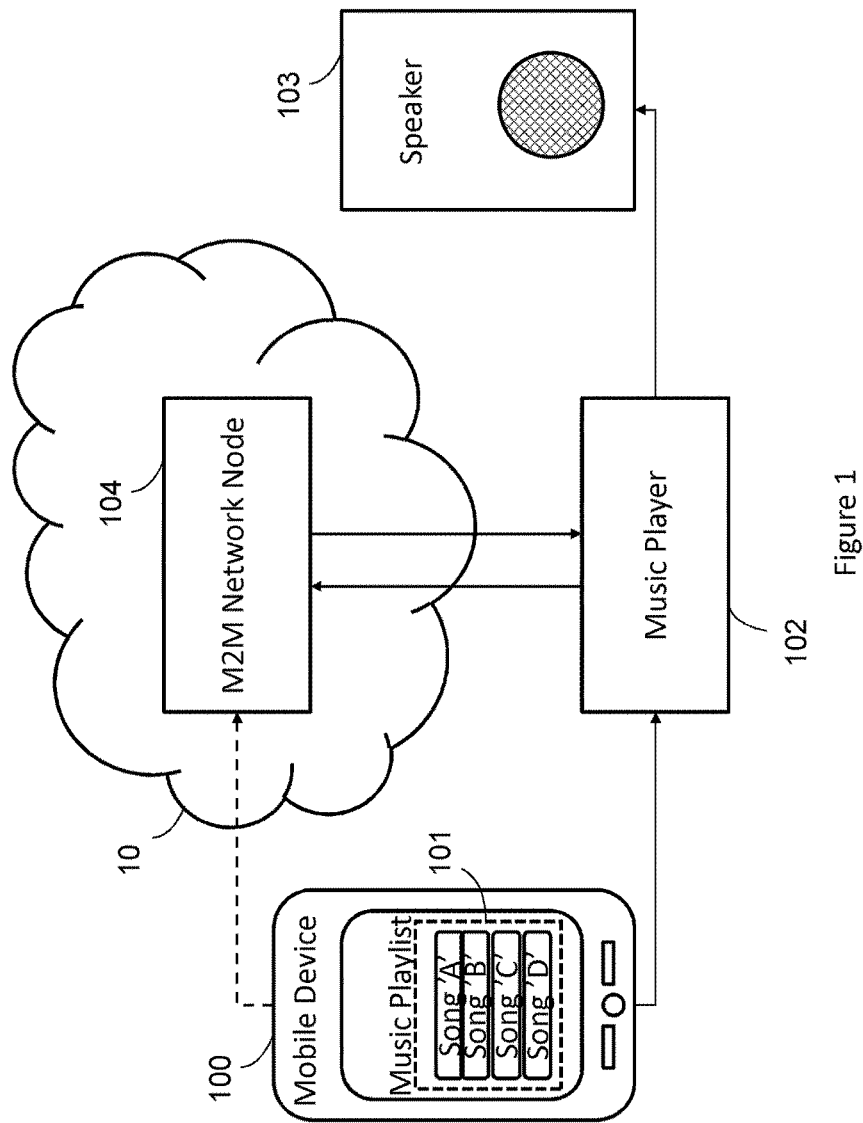
FIG. 1 illustratively shows a mobile device, a music player unit, a M2M network node and a speaker unit, in a M2M communication network.

FIG. 1 show an illustrative example of a system onto which the embodiments described herein can be used. The mobile device 100 used in the exemplary embodiments, e.g. a cellular phone, smart phone, MP3 player, tablet PC or Laptop, display a music playlist 101. The mobile device can be any electronic device by which a user can access a music playlist. In a preferred embodiment the mobile device includes a display unit. The display unit is arranged to display music playlists comprising information about the various songs, e.g. the song title, artist, and duration. The mobile device typically includes one or more user input units, which are arranged to detect user commands and user inputs. The user normally controls the mobile device using the user input unit e.g. the user selects which song to play from the music playlist, or to increase/decrease speaker volume or to turn the mobile device on and off. The user input units may include soft keys, hard keys, buttons, joysticks, or multidirectional buttons and can also include touch-sensitive areas and touch-sensitive displays such as a touch-pad or a touch-screen. An exemplary mobile device may also include other elements normally present in such devices, a speaker, a microphone, a camera unit, a processor, a memory or storage unit, an AM/FM radio transmitter and receiver. The mobile device further includes a communication unit adapted, e.g., for short-range wireless communication (Bluetooth, Near Field Communication (NFC), Infrared, and Wireless LAN (W-LAN: according to the IEEE 802.11 standards)), long-range wireless communication (e.g. according to cellular standards such as 2G, 3G or Long Term Evolution (LTE or 4G), and/or wired communication. Using the communication unit the mobile device can send/receive music playlists. For example, user of the mobile device can send a music playlist from the mobile device to the M2M network node or to the music player unit.

A music playlist 101 is a list of songs. The music playlist is sometimes used to define the order in which songs are played. A music playlist may also define an entire catalogue of songs or a part of a catalogue of songs. The music playlist is normally a list of songs, which may also include information of the various songs such a title, artist, duration, album cover etc. The song list may be personalized by only including selected songs. In a music streaming service, songs from a music playlist are streamed from a streaming server to the mobile device. Music playlist are available in a wide range of formats e.g. vlc is a format used by VLC Media Player, .wpl, is an XML format used in Microsoft Windows Media Player versions 9-11, and .smil is an XML recommendation of the World Wide Web Consortium that includes playlist features, however, music playlists are not limited thereto. User can also share music playlist with each other. For example a user of the mobile device may upload his playlist on the internet, or he may send it to, or receive it from, another mobile device, using the communication unit.

FIG. 1 illustratively shows how the mobile device is connectable to a music player unit 102. The music player unit is a device that is configured to play songs included in a music playlist. The music player unit is capable of storing and playing digital music which is electronic stored, such as e.g. audio files. The music player unit may also be a device that is able to stream songs comprised in a music playlist from a music streaming server, or to play songs from a music playlist, where the songs in the playlist are downloaded from music servers stored locally on the music player unit for example in the memory unit. An example of the former is music player unit which is running the Spotify™ application, where the song from the music playlist is streamed from the Spotify™ streaming servers. The music player unit may include a stereo device, a juke box, disc jockey mixer board, MP3 player, a mobile phone, a laptop, or a to a hi-fi device to name a few. The music player unit is connected to a speaker unit 103, which is used to play-out the songs.

The M2M Network node 104 is a network node that is connectable to a machine-to-machine (M2M) communication network 10. The M2M network node in particular is connectable to the mobile device 100. The M2M network node is also connectable to the Music Player Unit 102. The M2M network is also configured such that an Application is included in the M2M network node. The Application is Music Play list application.

Figure 2:
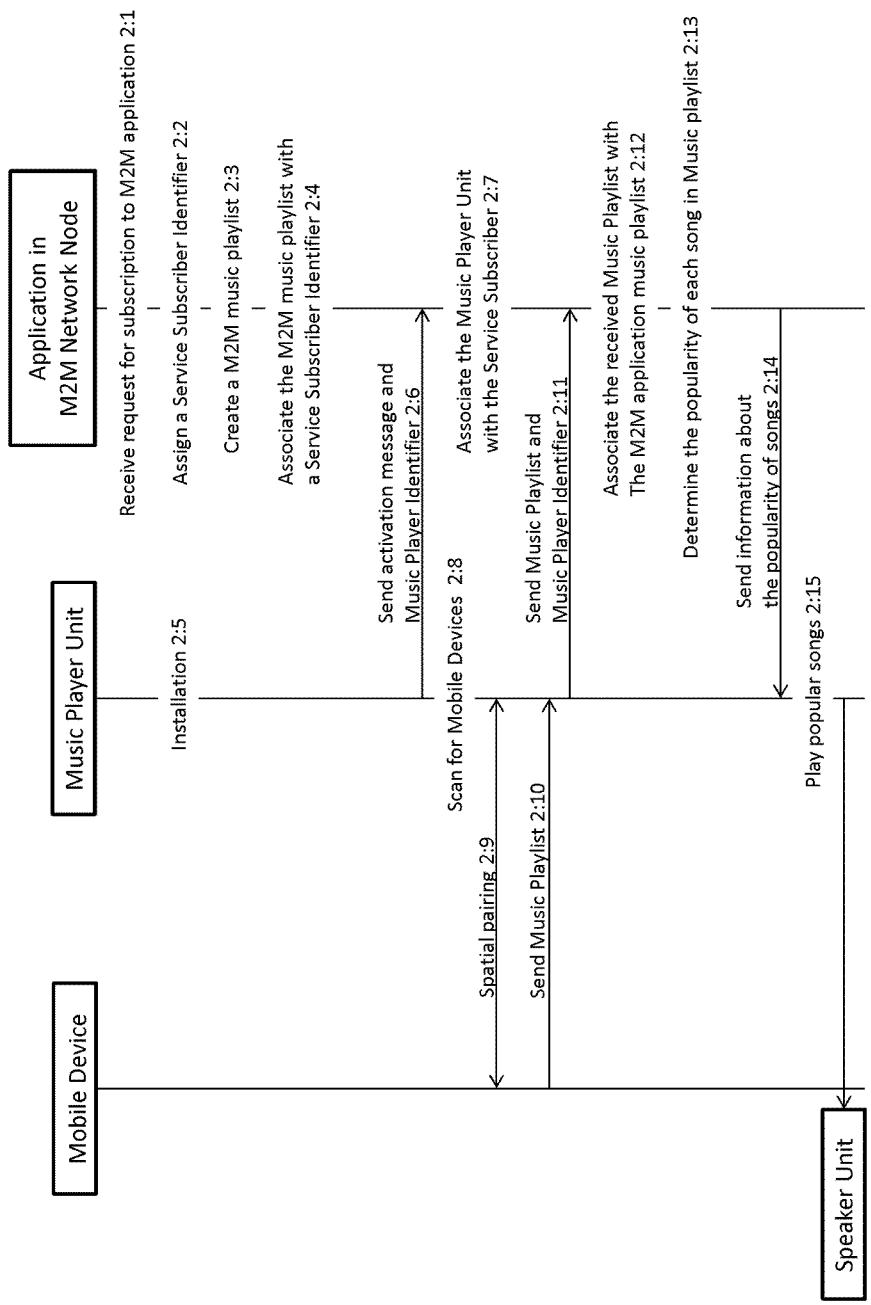
FIG. 2 is a signalling diagram illustrating in more detail how the inventive solution can be implemented in practice, in accordance with further embodiments.

An exemplary embodiment will be explained with reference to FIG. 2. In step 2:1 the Application in the M2M network node receives a request for a subscription. The subscription request is a request from the service subscriber to subscribe to the service provided by the Application. The service subscriber could for example an enterprise such as Restaurant, Night Club, Bar or Hotel. The subscriber could also be a person such as a user, an individual, and a consumer, who is for example hosting a party at home. The service subscriber is then assigned a service subscriber identifier, step 2:2. The service subscriber identifier identifies the service subscriber. The service subscriber identifier can for example be a number or tag by which the service subscriber is uniquely identified. There may be several service subscribers that are subscribed to the Application and the Application must be able to uniquely identify each service subscriber. In step 2:3 a M2M music playlist is created. The M2M music playlist is configured to list songs. The M2M music playlist may include a predefined list of songs, alternatively may initially be empty. The M2M music playlist is then associated with a service subscriber identifier, step 2:4. The Application can manage several service subscribers and several M2M music playlists, it is therefore necessary that each music playlist is associated to a service subscriber identifier. The association assure that the Application can always identify which M2M music playlist is linked to which service subscriber.

The service subscriber installs and activates a music player unit so that it is ready for use, step 2:5. The service subscriber may also use an already installed music player unit in the exemplary embodiments. To activate the service of the Application, an activation message is sent from the music player unit to the Application in the M2M network node, step 2:6. The activation message includes a music player identifier. The music player identifier includes information such that the music player unit can be associated with the service subscriber. The music player identifier could for example be a number or tag by which it is possible for the Application to associate the music player to the service subscriber or service subscriber identifier. In step 2:7 the Application associates the music player unit with a service subscriber.

Figure 3:
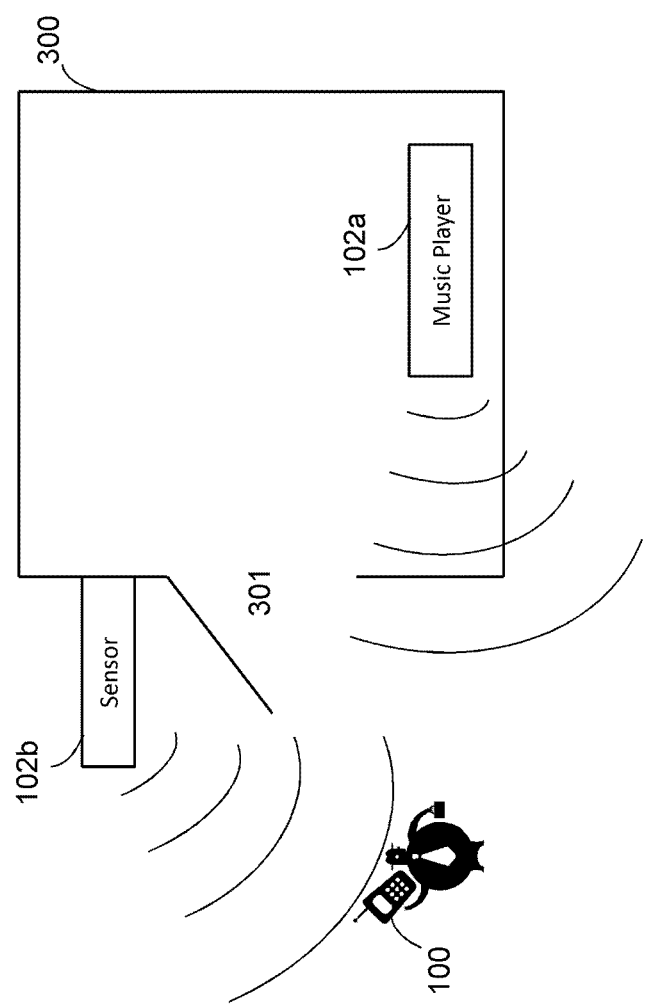
FIG. 3 illustratively shows a sensor unit and music player unit scanning for mobile devices in the proximity.
Figure 4:
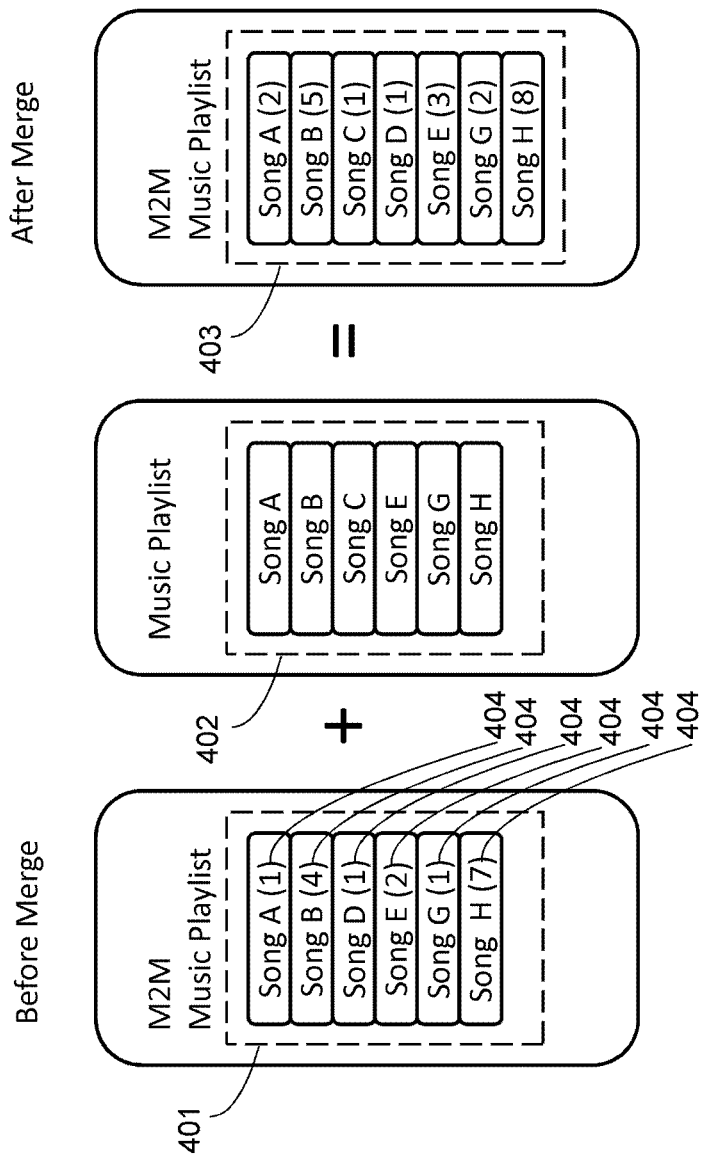
FIG. 4 schematically shows a M2M music playlist and a music playlist received from the music player unit being merged into a new M2M music playlist.

The music player unit scans for mobile devices 100 in the proximity, step 2:8. The music player unit can for example scan the proximity using short range technology such as Bluetooth, NFC or RFID. FIG. 3 illustratively shows an exemplary embodiment of the music player unit scanning the proximity for mobile devices. The music player unit may include the short range technology used to scan the proximity for mobile device. In an alternative embodiment the music player unit includes a music player 102a and at least one sensor unit 102b, which can be located at a different position compared to the music player. The sensor unit may include short range technology to scan the proximity for mobile devices. In the illustrative example of FIG. 3 the music player is placed inside facility 300 being for example a Restaurant, Night Club, Bar or Hotel and the sensor unit is located at the entrance 301 of the facility. When an individual carrying a mobile device enters facility the sensor unit detects the presence of a mobile device. The music player unit pairs with the mobile device in a spatial pairing, step 2:9. The pairing includes establish a communication channel between the mobile device and the music player unit. In step 2:10 a music playlist is sent from the mobile device to the music player unit. The music playlist can be requested by the music player unit or the music playlist can be pushed from the mobile device to the music player unit. In one exemplary embodiment the music player unit sends a request for a music playlist to the mobile device. The mobile device informs the user of the request. The mobile device can for example display the question on the display unit or using a voice command. In response to the request the user utilizes the user input unit to accept or reject the request. In step 2:11 the music player unit sends the music playlist, received from the mobile device, and a music player identifier to the Application in M2M network node. In an alternative embodiment the mobile device sends the music playlist directly to the M2M network node. The Application associates the received Music Playlist with a M2M Music Playlist, where the M2M Music Playlist associated with the Service Subscriber, step 2:12. In a one embodiment the Application merges the music playlist, received from the music player unit, with the M2M music playlist. FIG. 4 schematically illustrates a M2M music playlist before the merge 401, the music playlist 402 received from a mobile device, and the M2M music playlist after the merge 403.

In step 2:13 the Application determines the popularity of the songs included in the music playlist received from the music player unit, wherein the popularity is determined based on the occurrence of the songs in the M2M music playlist and the received music playlist. FIG. 4 illustrates an exemplary embodiment. A counter 404 is associated to each song in the M2M music playlist. Further a counter is created for each song in the music playlist received from the mobile device, but the counter is created only if a counter is not already available for that specific song. When the music playlists 401 and 402 are merged into one music playlist 403 the song counter is updated accordingly. Song A has a count of 1 in the M2M music playlist before merging. Song A is also included in the music playlist received from the mobile device. Therefore the song counter for Song A is updated to a count of 2 after the music playlists are merged. Song C is included in the music playlist received from the mobile device but not in the M2M music playlist before the merge. Therefore a song counter is created for Song C. After the merge the song counter for Song C has a count of 1. Song D has a count of 1 before the merge with the music playlist received from the mobile device. Song D is however not present in the received music playlist and therefore the counter remains at a count of 1 also after the music playlists are merged. In the exemplary embodiment of FIG. 4 the occurrence of a song in the M2M music playlist is measured by the song counter. Hence the popularity of a song is obtained from the song counter, the higher the song count is the more popular the song.

The Application sends information to the music player unit about the popularity of a song or songs included in the music playlist, step 2:14. In the exemplary embodiment with reference to FIG. 4, if a song reaches a count of 4 or more the Application send information about that song to music player unit. The Application would send information about songs B, and H, which have a count of 5 and 8, respectively. In an alternative embodiment the Application would determine the most popular song and send information about the most popular song comprised in the merged music playlist to the music player unit. In the exemplary embodiment of FIG. 4, the Application would determine that Song H is the most popular song because the counter for Song H is 8. Information about Song H and information that it is the most popular song is sent to music player unit from the M2M Network Node by the Application. In an alternative embodiment the popularity of several songs are sent to the music player unit. The music player unit plays the songs based on the information received form the Application, step 2:15. The music player unit uses the speaker unit to play-out the songs. If the music player unit receives information that Song B and H have a count of 4 or higher it will play those songs. Alternatively if the music player unit receives information that Song H is the most popular song that it plays Song H.

The music player unit may installed in at Night Club, or in a Restaurant. The music player unit may be a juke box or a DJ mixer that are being used to provide music and songs at a Night Club or Restaurant. The music player unit could also be installed at Home and could for example be a home entertainment system. Once the music player unit is installed, it should activate the service offered by the Application in the M2M network node. The activation of the service may include sending an activation message to the M2M network node such that the Application can initiate the service. The activation message preferably also includes a music player identifier. The music player identifier could be a serial number which uniquely allows the Application to identify the music player unit and thereby also the the service subscriber, which may be the enterprise, the owner, or a user. The music player unit, which may include sensor units, scans the proximity for mobile devices, and this could in the exemplary embodiment be done by a Bluetooth triangulation, where the triangulation is achieved by the music player and the sensor unit, which are positioned at a spatially different location as compared to the music player unit. For example the sensor unit could be positioned at the entrance of the Restaurant, Night Club, or Home, and thereby detects the mobile device such as mobile phones, of the individuals entering the Restaurant, Night Club or Home. The music player unit or sensor units could also scan the proximity using RFID or NFC technology. Once the mobile device is detected, the music playlist is sent from the mobile device to the M2M network node and thereby to the Application. At a crowded Restaurant, or at a busy party at Home, several music playlists will be sent from mobile devices. It may even be so that several playlists are sent from one mobile device. The Application determines the popularity of a song based on the occurrence of the song in the various music playlists received from the mobile devices detected during scanning. If a song is very popular among the individuals visiting the Restaurant or Night Club or a party at Home, it will appear in many of the music playlist received from the mobile devices. The Application will send the information about the popularity of a song or songs to the music player unit. The music player unit will then play the songs based on the determined popularity. The advantage is that only songs that are popular or that at least occurs frequently in the music playlists of the individuals visiting the Restaurant, Night Club or Home will be played.

Figure 5:
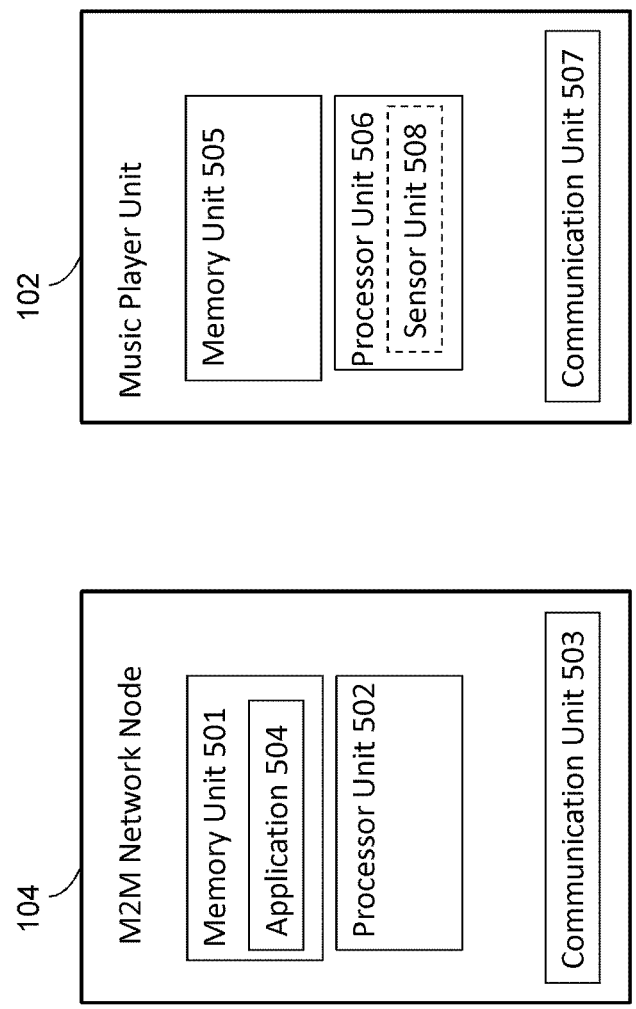
FIG. 5 is schematic block diagrams illustrating a M2M network node and a music player unit.

FIG. 5 show block diagrams of a M2M network node 104 and music player unit 102, respectively.

Figure 6:
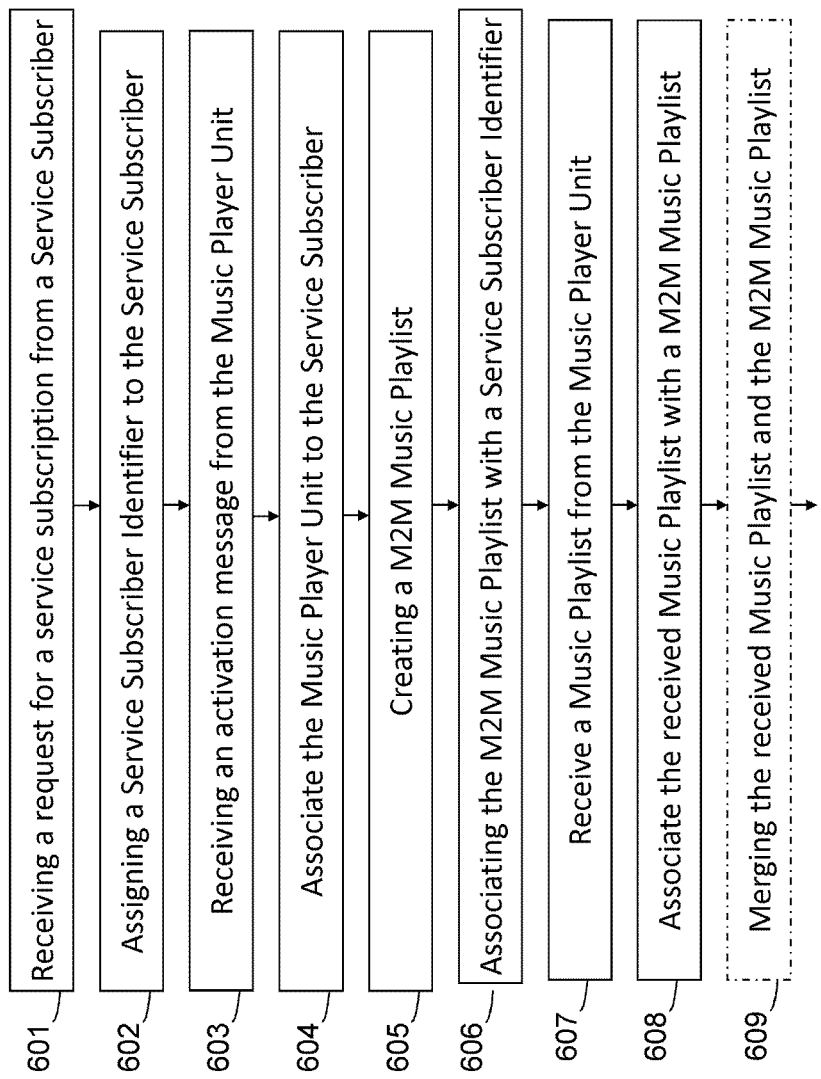
FIGS. 6 and 7 show a flow diagram of an exemplary embodiment.
Figure 7:
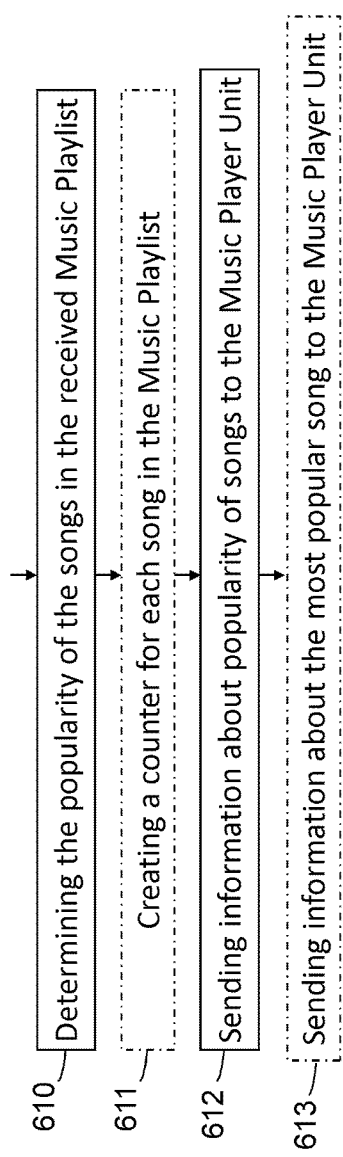

The M2M network node includes a memory unit 501, a processor unit 502, and a communication unit 503. The memory unit 501 can store an Application 504 with computer program instructions that, when executed by the processor unit 502, carry out operations of the M2M network node (e.g., as illustrated in the signaling diagram of FIG. 2, and in the flow diagram of FIGS. 6 and 7). As an example, the memory unit can be non-volatile memory, such as a flash memory, that retains the stored data while power is removed from the memory unit. The communication unit is adapted, e.g., for short-range wireless communication (Bluetooth, Near Field Communication (NFC), Infrared, and Wireless LAN (W-LAN: according to the IEEE 802.11 standards)), long-range wireless communication (e.g. according to cellular standards such as 2G, 3G or Long Term Evolution (LTE or 4G), and/or wired communication. Using the communication unit the M2M network node can receive music playlists and send information about popularity of songs. The operations of the M2M network node will now be described with reference to the flow chart in FIGS. 6 and 7. The operations of the M2M network node include receiving a request for a service subscription, from a service subscriber, for the service provided by the Application, step 601. Thereafter the M2M network node operations include assigning a service subscriber identifier to the service subscriber such that the service subscriber can be uniquely identified by the service subscriber identifier, step 602. Before starting to use the service provided by the Application, a service subscriber needs to install the music player unit and send an activation message to the M2M network node such that the service is initiated or activated. The operations of the M2M network node therefore include receiving an activation message from a music player unit, step 603. The activation message includes a music player identifier, where the music player identifier includes information such that the music player unit can be associated with the service subscriber identifier and thereby indirectly associate the music player unit with a service subscriber. In step 604 the operations include associating the music player unit to a service subscriber. The association of the music player unit to the service subscriber can be done by utilizing the music player identifier and the service subscriber identifier, and further by comparing the two identifiers. The operations of the M2M network node further includes creating a M2M music playlist, step 605. The M2M music playlist is music playlist stored in memory unit of the M2M network node. In step 606 the M2M music playlist is associated with a service subscriber identifier, and thereby indirectly associating the M2M music playlist to a service subscriber. Furthermore the operations of the M2M network node include receiving a music playlist and a music player identifier from the Music Player Unit, step 607. The music player identifier identifies the music player unit, such that it becomes clear for the Application from which music player unit the music playlist is sent and thereby to which service subscriber the music playlist is associated. In step 608, the operation of the M2M network node includes associating the received music playlist with the M2M music playlist associated with the service subscriber. In one optional operation, step 609, the association of the M2M music playlist with the music playlist includes merging the two lists into a single new M2M music playlist, cf FIG. 4. The operations of the M2M network node include determining the popularity of songs, step 610. The Application determines the popularity of the songs included in the received music Playlist based on the occurrence of the songs in the M2M Music Playlist and the received Music Playlist. In step 611 a song counter is created for at least one song comprised in the received music playlist. The counter counts the occurrence of the song in music playlists received from the music player unit and in the associated M2M music playlist. The counter is disclosed in the embodiments above. The information about the popularity of songs is sent from the M2M network back to the music player unit, step 612, and in one embodiment the information includes information about the most popular song, step 613.

The music player unit 102 includes a memory unit 505, a processor unit 506, and a communication unit 507. A sensor unit 508 may be included in the processor unit. The memory unit 505 can store computer program instructions that, when executed by the processor unit 506, carry out operations of the music player unit (e.g., as illustrated in the signaling diagram of FIG. 2, and in the flow diagram of FIG. 8). As an example, the memory unit can be non-volatile memory, such as a flash memory, that retains the stored data while power is removed from the memory unit. The communication unit is adapted, e.g., for short-range wireless communication (Bluetooth, Near Field Communication (NFC), Infrared, and Wireless LAN (W-LAN: according to the IEEE 802.11 standards)), long-range wireless communication (e.g. according to cellular standards such as 2G, 3G or Long Term Evolution (LTE or 4G), and/or wired communication. Using the communication unit the music player node can send music playlists and receive information about popularity of songs. The operations of the music player unit will now be described with reference to flow charts in FIG. 8. The operations of the music player unit include the optional steps of installing the music player, step 701, and sending an activation message sending to the M2M network node, step 702, where the activation message include a music player identifier. The music player identifier includes information such that the music Player unit can be associated with the service subscriber. The operations of the music player also include scanning the proximity for mobile devices, step 703. The processing unit may include one or more sensor units that are utilized for scanning. The operation of scanning was described in the embodiments above with reference to FIG. 3. If during scanning a mobile device is detected in the proximity, the music player unit connects to mobile device, step 704. The connection may be established by pairing the music player unit and the mobile device. In step 705 the operations of the music player unit includes receive a music playlist from the mobile device. The operations may also include requesting a music playlist from the mobile device, and the mobile device sends a music playlist to the music player unit in response to the request. The music player unit sends the music playlist and a music player identifier to the M2M network node such that they can be received by the Application, step 706. The music player identifier is configured such that the Application can identify the associated music player unit and associates the music player unit to a service subscriber. In response, in step 707, the music player unit receives information about the popularity of at least one song included in the music playlist from the M2M network node. In one embodiment the information about the popularity of all songs in the music playlist is received. Finally, in step 708, music player unit plays-out the songs, for which information about their popularity is received from the M2M network node. If for example the music player unit receives information that Song H is the most popular song then the that song will be played out using the speaker unit. In another exemplary embodiment the music player unit receives information that Song B and Song H are the most popular then both those songs will be played-out It should be noted that the above-mentioned embodiments are used here to illustrate rather than limit the invention, and that those skilled in the art are free to use alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method for a Music Player Unit, the Music Player Unit being provided in a machine-to-machine (M2M) communication network and being connected to an M2M Network Node and to a Speaker Unit, the method comprising:
    connecting to a Mobile Device in proximity to the Music Player Unit;
    receiving a Music Playlist from the Mobile Device;
    sending, to an Application in the M2M Network Node, the Music Playlist and a Music Player Identifier, wherein the Music Player Identifier identifies the Music Player Unit and associates the Music Player Unit with a Service Subscriber;
    receiving information, from the Application, about the popularity of at least one song comprised in the received Music Playlist; and
    playing-out the at least one song using the Speaker Unit.

2. The method as claimed in claim 1, further comprising:
    scanning for Mobile Devices in proximity to the Music Player Unit using a short-range communication technology.

3. The method as claimed in claim 1, further comprising:
    sending, to the Application, an activation message, wherein the activation message comprises the Music Player Identifier.

4. The method as claimed in claim 1, wherein the information about the popularity of the at least one song comprises information that indicates which song is the most popular among songs comprised in the received Music Playlist and wherein that song is played-out using the Speaker Unit.

5. A machine-to-machine (M2M) Network Node configured to be connectable to an M2M communication network and to a Music Player Unit, comprising:
    a processor circuit; and
    a memory circuit coupled to the processor circuit and comprising an Application comprising computer readable program code embodied in the memory circuit that when executed by the processor circuit causes the M2M Network Node to perform operations comprising:
    receiving, from the Music Player Unit, a Music Playlist and a Music Player Identifier, wherein the Music Player Identifier identifies the Music Player Unit and associates the Music Player Unit with a Service Subscriber;
    associating, using the Application, the received Music Playlist with an M2M Music Playlist associated with the Service Subscriber;

determining, using the Application, the popularity of songs included in the received Music Playlist, wherein the popularity is determined based on the occurrence of songs in the M2M Music Playlist and the received Music Playlist, and based on the popularity of the songs; and sending information about the popularity of at least one song comprised in the received Music Playlist to the Music Player Unit.

6. The M2M Network Node as claimed in claim 5, wherein the operations further comprise:

receiving, at the M2M Network Node, a request for a service subscription, from a Service Subscriber, for the Application; and assigning a Service Subscriber Identifier to the Service Subscriber, wherein the Service Subscriber Identifier identifies the Service Subscriber.

7. The M2M Network Node as claimed in claim 5, wherein the operations further comprise:

creating the M2M Music Playlist; and associating the M2M Music Playlist with the Service Subscriber Identifier.

8. The M2M Network Node as claimed in claim 5, wherein the operations further comprise:

receiving, from the Music Player Unit, an activation message, wherein the activation message comprises the Music Player Identifier, and wherein the Music Player Identifier comprises information such that the Music Player Unit can be associated with the Service Subscriber; and associating the Music Player Unit with the Service Subscriber.

9. The M2M Network Node as claimed in claim 5, wherein the operations further comprise:

creating a counter for at least one song, wherein the counter is indicative of the occurrence of the at least one song in music playlists received from the Music Player Unit and in the associated M2M music playlist.

10. The M2M Network Node as claimed in claim 5, wherein the operations further comprise:

merging the received Music Playlist and the M2M Music Playlist into a merged M2M Music Playlist.

11. The M2M Network Node as claimed in claim 10, wherein the operations further comprise:

sending information about the most popular song comprised in the merged M2M Music Playlist to the Music Player Unit.

12. A Music Player Unit configured to be connectable to a machine-to-machine (M2M) communication network, to an M2M Network Node, and to a Speaker Unit, the Music Player Unit comprising:

a processor circuit; and a memory circuit coupled to the processor circuit and comprising a computer readable program code embodied in the memory circuit that when executed by the processor circuit causes the Music Player Unit to perform operations comprising:

connecting to a Mobile Device in proximity to the Music Player Unit;

receiving a Music Playlist from the Mobile Device;

sending, to an Application in the M2M Network Node, the Music Playlist and a Music Player Identifier, wherein the Music Player Identifier identifies the Music Player Unit and associates the Music Player Unit with a Service Subscriber;

receiving information, from the Application, about the popularity of at least one song comprised in the received Music Playlist; and playing-out the at least one song using the Speaker Unit.

13. The Music Player Unit as claimed in claim 12, wherein the operations further comprise:

scanning for Mobile Devices in proximity to the Music Player Unit using a short-range communication technology.

14. The Music Player Unit as claimed in claim 12, wherein the operations further comprise:

sending, to the Application, an activation message, wherein the activation message comprises the Music Player Identifier, wherein the Music Player Identifier comprises information such that the Music Player Unit can be associated with the Service Subscriber.

15. The Music Player Unit as claimed in claim 12, wherein the information about the popularity of the at least one song comprises information that indicates which song is the most popular among songs comprised in the received Music Playlist and wherein that song is played-out using the Speaker Unit.

* * * * *